May 9, 1933.  H. M. ROBERTSON  1,908,186
KILN TRUCK
Filed Nov. 8, 1930
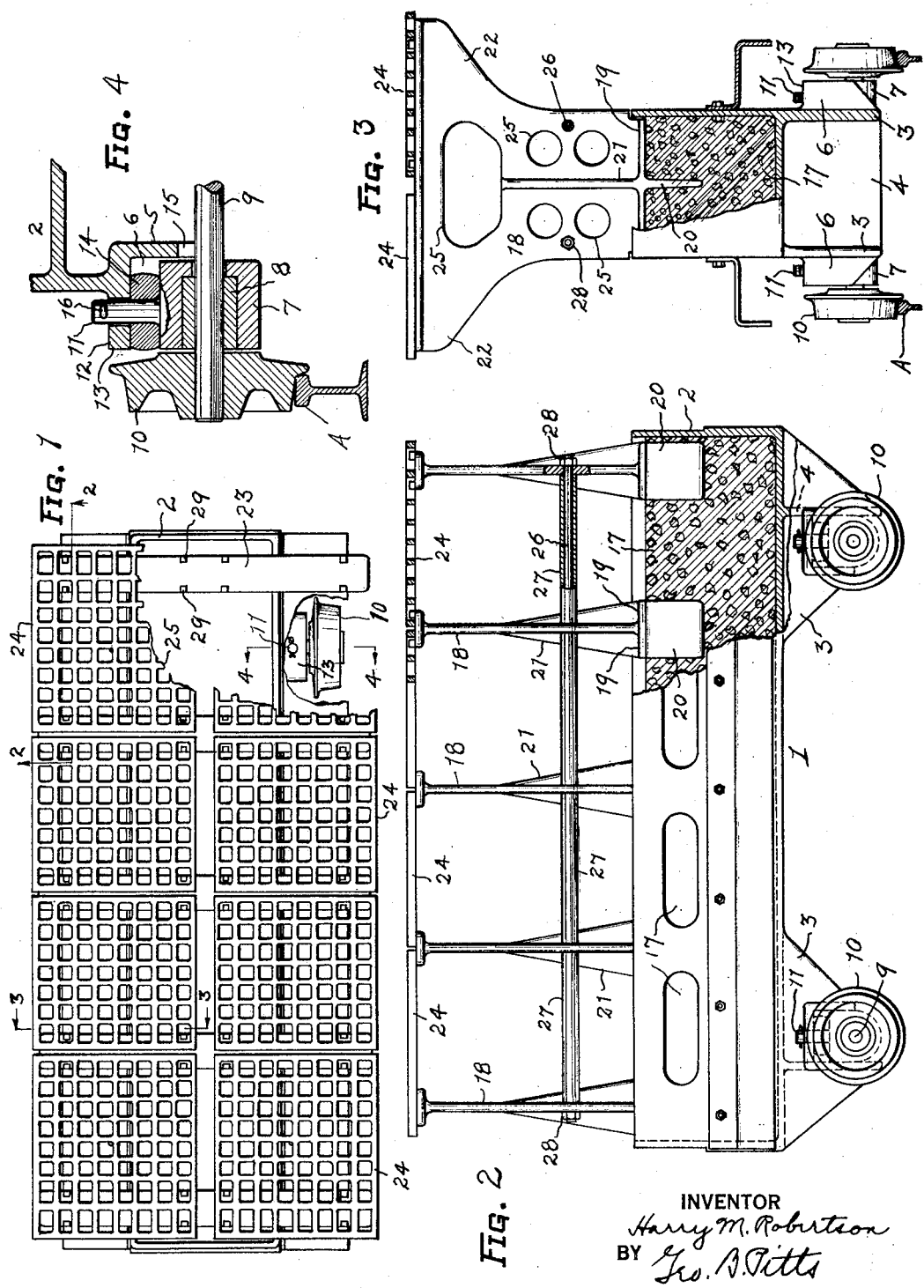
INVENTOR
Harry M. Robertson
BY Geo. A. Pitts
ATTORNEY Patented May 9, 1933

1,908,186

UNITED STATES PATENT OFFICE

HARRY M. ROBERTSON, OF CLEVELAND, OHIO

KILN TRUCK

Application filed November 8, 1930. Serial No. 494,351.

This invention relates to a truck, more particularly a truck for conveying material into and through tunnel kilns although it may be adapted to other uses.

One object of the invention is to provide a truck of this character having large carrying capacity but constructed to permit substantially unobstructed flow or circulation of the heating, burning and cooling mediums to the entire area or space below the ware or material loaded on the truck and uniform distribution of the mediums upwardly to insure uniform and effective treatment of the ware or material; this improved construction also permits ready access to those parts of the truck that are exposed to the heat, whereby they may be cleaned or painted or otherwise treated to prevent oxidation and scaling.

Another object of the invention is to construct a truck in which the parts or portions subjected to the maximum heat conditions are formed of metal, but are so constructed, arranged, and mounted that danger of overheating is avoided.

Another object of the invention is to provide a truck, which is relatively simple and provided with removable ware supporting bases.

A further object of the invention is to provide an improved truck applicable to tunnel kilns in which the truck runs on tracks below and outside the kiln chamber or ware space, but which projects through and traverses an opening formed in the kiln walls to support the ware within the kiln, such construction and arrangement being shown in my application Ser. No. 320,175 filed November 17, 1928.

A further object is to provide an improved kiln truck in which provision is made for (a) cushioning the loaded ware, so that danger of tilting thereof or jarring with resulting markings or scratches of the ware is avoided, and (b) anti-friction bearings.

Other objects of the invention will be apparent to those skilled in the art to which my invention relates from the following description taken in connection with the accompanying drawing, wherein Fig. 1 is a plan view of a truck embodying my invention, parts being broken away.

Fig. 2 is a side elevation, partly in section on the line 2—2 of Fig. 1.

Fig. 3 is an end view of the truck, parts being broken away.

Fig. 4 is a section on the line 4—4 of Fig. 1.

In the drawing, 1 indicates a frame shaped to form a casing 2 having bottom, side and end walls and pairs of depending brackets 3, which are reinforced by a transverse web 4. The lower end of each bracket has integral rear and side walls 5, 6, forming guides for a bearing block 7. Each block 7 is provided internally with an anti-friction bearing such as rollers 8 for an axle 9, a wheel 10 (preferably a flanged wheel) being fixed to the axle and co-operating with the wheel at the opposite end of the axle to prevent endwise movement of the latter. The bearing box 7 is provided with an up-standing shank 11, which extends through and slidably fits an opening 12 formed in the top wall 13, to prevent rotation of the box 7. The top wall 13 is formed integrally with the walls 5, 6, and bracket 3. These walls also serve to protect the box 7 and a cushion or spring device 14, interposed between the box 7 and wall 13. The spring device absorbs shocks imparted to the truck as it is conveyed through the kiln, so that jarring of the ware, which would be scratched or marked, is eliminated. The spring device herein shown consists of a pad of rubber formed with an opening so that it may be placed around the shank 11. The wall 5 is formed with a slot 15 to permit vertical movement of the axle 9, which is limited upwardly by the end walls of the slots 15 and downwardly by cotter pins 16 on the free ends of the shanks 11.

The casing 2 is filled with cement 17 which constitutes a relatively heavy mass of material and being mounted relatively low, tends to stabilize the truck to prevent tipping thereof. The cement 17 is filled approximately to the top of the casing 2.

18 indicate a series of upright members disposed in spaced relation and supported in and by the mass of cement 17. Each member 18 is flanged in opposite directions from end to end along its lower edge, as shown at 19, which flanges rest on the body of cement, and provided with a depending wing 20, which is embedded in the cement; it is also provided with reinforcing ribs 21. The upper portion of each member is widened, as shown at 22, to extend laterally at either side of the opening in the kiln bottom wall to obstruct the flow of heat therethrough and also to provide a wide support for the ware supporting bases in the ware space within the kiln. The upper end of each member 18 is provided from end to end with integral plates 23 on which ware supporting bases 24 rest. Each member 18 is formed with a plurality of openings 25 to insure free circulation of the heating and cooling mediums. 26 indicates rods extending through aligned openings formed in members 18 and 27 indicates sleeves surrounding the rods between the members, the ends of the rods being secured to the end members by nuts 28, which act through the sleeves to brace and rigidly connect the members in spaced relation. The plates 23 are preferably provided with up-standing lugs 29 which interlock with the bases 24 to hold them on the plates.

The bases 24 are preferably disposed in two rows to leave a relatively wide central opening through which a large volume of the heating or cooling medium or kiln atmosphere may gain access to the central portion of the ware load; also each base is of grill or lattice-work construction, whereby the major portion of the supporting area is open for the flow of the mediums or kiln atmosphere to the ware. The bases 24 are removable and may be reversed or turned over in the event of warping.

By forming the truck frame with a casing and filling the latter with cement, both the frame and those portions of the truck which extend into the kiln are made rigid; and the frame is reinforced to withstand the application of power to push the loaded trucks through the kiln.

The upright members and supporting bases are formed of cast iron or steel where the temperature required in the operation of the kiln is not too high; where the truck is to be subjected to a higher temperature, they may be formed from heat resisting alloys.

From the foregoing description it will be noted that the upright members are widely spaced one from the other, that the plates at their upper ends are relatively narrow and that the ware supporting bases are of open work formation, and further, the upright members are formed with relatively large openings, this arrangement serving to permit free and adequate circulation of the kiln atmosphere throughout the travel of the truck.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck for conveying material into kilns, the combination of a wheel mounted hollow casing, said casing being filled with insulating material, upright members disposed in alined spaced relation and embedded at their lower ends in said material and supported entirely thereby out of contact with said casing, and ware supporting bases removably mounted on the upper ends of said members.

2. In a truck for conveying material into a kiln, the combination of a frame having pairs of depending brackets, each bracket being provided at its lower end with top, rear and side walls forming guides, a bearing box, bearings in each bearing box in said guides, an axle for wheels mounted in each two aligned bearings, a spring device between each bearing box and the adjacent top wall, a series of spaced upright members, means for mounting said members at their lower ends on but in insulated relation to said frame, and ware supporting bases removably mounted on the upper ends of said members.

3. In a truck for conveying material into a kiln, the combination of a wheel mounted frame, a mass of insulating material carried by said frame, a series of transversely arranged metallic plates supported on said mass of material out of contact with said frame and having depending portions embedded in said material and disposed in spaced relation and provided at their upper ends with supporting elements, and ware supporting bases mounted on said elements.

4. In a truck for conveying material into a kiln, the combination of a wheel mounted frame, a mass of insulating material carried by said frame, a series of transversely arranged metallic plates having portions embedded in said material and disposed in spaced relation and provided at their upper ends with supporting elements, and ware supporting bases mounted on said elements, said elements being provided with devices arranged to interlock with said bases.

5. In a truck for a kiln, the combination of a relatively long, narrow frame shaped to form a casing, said casing being filled with insulating material, a series of transversely arranged spaced plates supported on said material out of contact with said frame and having portions embedded in said material, whereby said plates are insulated from said frame, said plates having a width substantially equal to the width of said frame but widened laterally at both sides at their upper ends, and ware supporting bases removably mounted on the upper ends of said members.

6. In a truck for a kiln, the combination of a relatively long, narrow frame shaped to form a casing, said casing being filled with insulating material, transversely arranged plates having at their lower ends flanges resting on said material out of contact with said frame and portions embedded therein, said plates being adapted to extend through and traverse an opening formed in the bottom of a kiln chamber and widened at their upper end portions, and ware supporting bases mounted on the upper ends of said plates.

In testimony whereof, I have hereunto subscribed my name.

HARRY M. ROBERTSON.